United States Patent
Kawasaki (10) Patent No.: US 7,702,354 B2
(45) Date of Patent: Apr. 20, 2010

(54) TRANSMISSION POWER CONTROL METHOD AND MOBILE TERMINAL APPARATUS

(75) Inventor: Yoshihiro Kawasaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 461 days.

(21) Appl. No.: 11/826,118

(22) Filed: Jul. 12, 2007

(65) Prior Publication Data
US 2007/0265757 A1    Nov. 15, 2007

(51) Int. Cl.
H04B 7/00    (2006.01)
H04Q 7/20    (2006.01)

(52) U.S. Cl. .............. 455/522; 455/13.4; 455/127.1; 455/67.11; 370/252; 370/318

(58) Field of Classification Search ............ 455/69, 455/452.2, 509, 436, 522, 67.11, 67.16, 127.1, 455/343.1, 13.4, 226.2, 226.3, 226.1, 9, 68, 455/422.1; 370/335, 342, 318, 320, 332, 370/333, 252
See application file for complete search history.

(56) References Cited

U.S. PATENT DOCUMENTS

| 5,590,409 | A | 12/1996 | Sawahashi et al. | |
|---|---|---|---|---|
| 6,337,988 | B1 | 1/2002 | Agin et al. | |
| 6,343,206 | B1 | 1/2002 | Miya et al. | |
| 7,266,102 | B2 * | 9/2007 | Takano et al. | 370/332 |
| 7,315,733 | B2 * | 1/2008 | Ohsuge | 455/277.1 |
| 2005/0025098 | A1 * | 2/2005 | Terabe | 370/332 |
| 2006/0183481 | A1 * | 8/2006 | Furukawa et al. | 455/436 |
| 2008/0070610 | A1 * | 3/2008 | Nishio | 455/509 |
| 2009/0052403 | A1 * | 2/2009 | Hokao | 370/335 |
| 2009/0147867 | A1 * | 6/2009 | Okamoto et al. | 375/260 |
| 2009/0156248 | A1 * | 6/2009 | Hamabe | 455/522 |

FOREIGN PATENT DOCUMENTS

| EP | 0 936 753 A2 | 8/1999 |
|---|---|---|
| EP | 1 024 606 A2 | 8/2000 |
| JP | 2004-274117 A | 9/2004 |
| WO | WO 00/42717 | 7/2000 |

* cited by examiner

Primary Examiner—Sujatha Sharma
(74) Attorney, Agent, or Firm—Myers Wolin, LLC (57) ABSTRACT

A base station creates and transmits power control data to a mobile terminal at each prescribed time slot based on signals received from the mobile terminal, and the mobile terminal controls the transmission power of signals to the base station based on the power control data. During this transmission power control, the mobile terminal measures the reception level of common pilot signals transmitted from the base station at each time slot, calculates a moving average of the reception level for a plurality of time slots, and when transmission to the base station is interrupted, stores the transmission power and moving average for the immediately preceding time slot, and when transmission to the base station is resumed, adds the difference between the moving average at the time of transmission resumption and the stored moving average to the stored transmission power, and uses the power obtained by this addition as the signal transmission power at the time of transmission resumption.

10 Claims, 10 Drawing Sheets

Po1, Po2, Po3 ···, TRANSMISSION SIGNAL OUTPUT VALUES
TPC1, TPC2, TPC3 ···, TRANSMISSION POWER CONTROL COMMANDS

TRANSMISSION POWER CONTROL METHOD AND MOBILE TERMINAL APPARATUS

BACKGROUND OF THE INVENTION

This invention relates to a transmission power control method and a mobile terminal apparatus, and in particular relates to a transmission power control method for a mobile terminal when resuming transmission after transmission has been interrupted, and to a mobile transmission apparatus.

Figure 7:
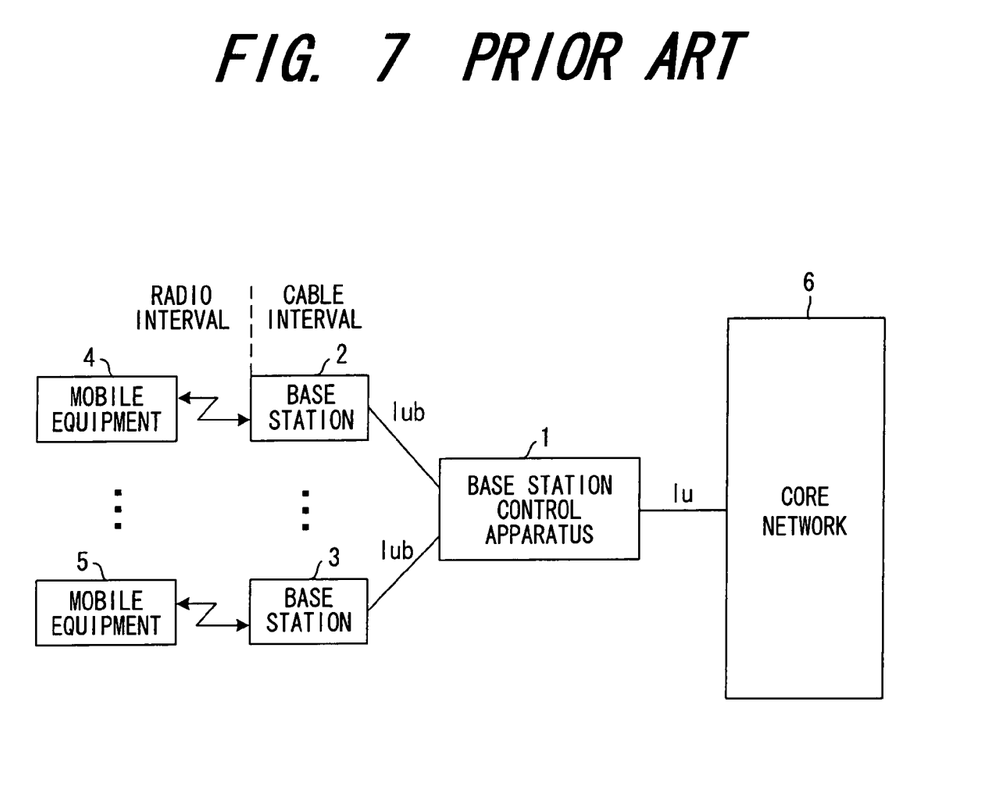
FIG. 7 shows in summary the configuration of a radio communication system.

Specifications for radio communication systems using W-CDMA have been prepared by the 3rd Generation Partnership Project (3GPP), and actual services based on them are already in operation in many countries including Japan. FIG. 7 is a summary diagram of the configuration of a radio communication system. A 3GPP radio access system comprises a base station control apparatus (radio network controller) 1, base stations (node B) 2, 3, . . . , and mobile terminals (user equipment) 4, 5, . . . The base station control apparatus 1 is connected to the core network 6 via an Iu interface, and is connected to base stations 2, 3 via an Iub interface.

Figure 8:
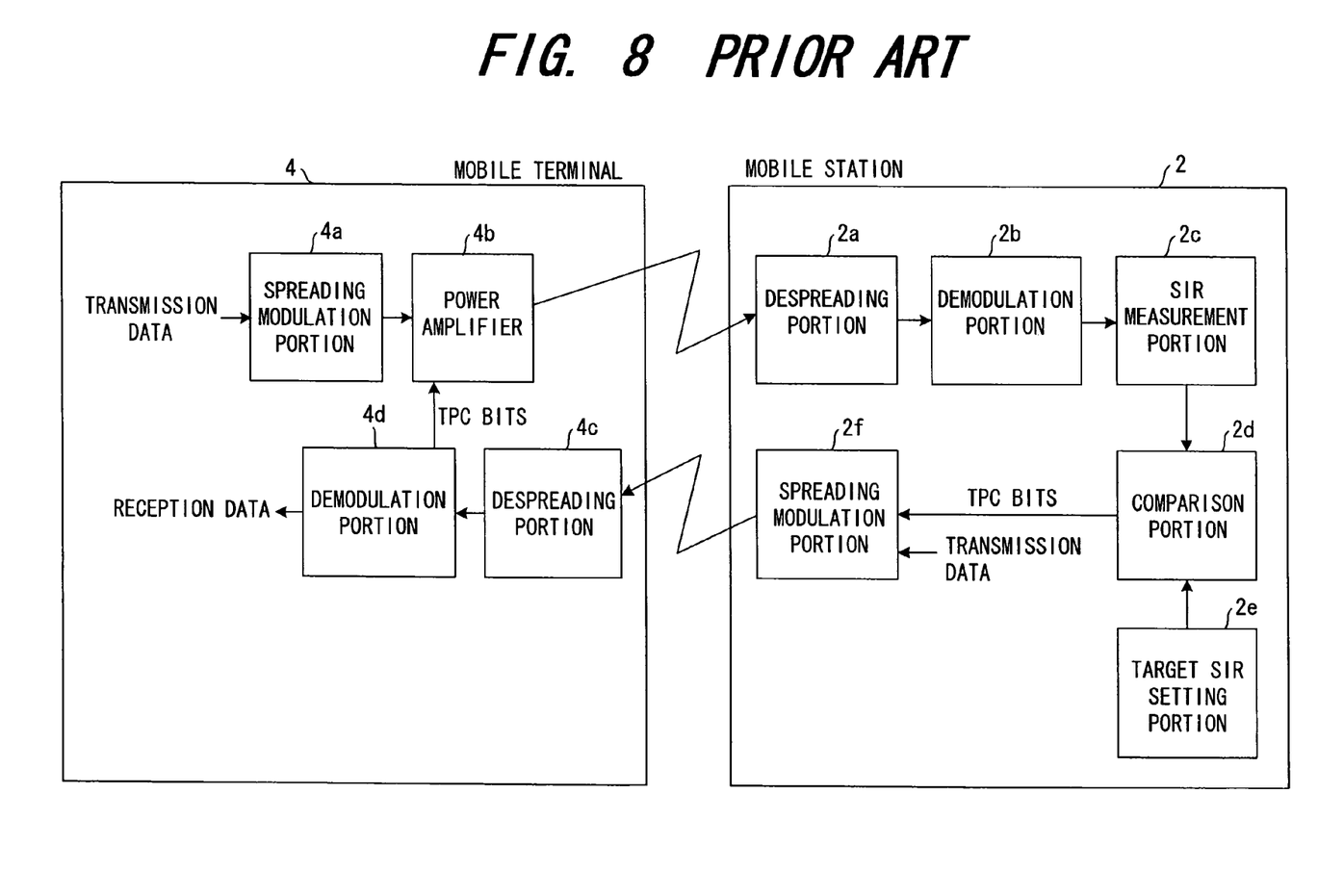
FIG. 8 is an explanatory diagram of transmission power control (inner-loop power control)

In a mobile communication system conforming to these 3GPP specifications, transmission power control is executed such that a prescribed error rate is obtained by base stations 2, 3 and mobile terminals 4, 5, and such that transmission power is not excessive. FIG. 8 is an explanatory diagram of such transmission power control (inner-loop power control), showing a case of transmission power control for a base station.

The spreading modulation portion 4a of a mobile terminal 4 uses a spreading code in spreading modulation of transmission data, and the power amplifier 4b amplifies signals obtained by orthogonal modulation, frequency conversion and the like after spreading modulation, and transmits the signals to the base station 2 from an antenna. The despreading portion 2a of the reception portion of the base station performs despreading processing of the received signals, and the demodulation portion 2b demodulates the received data. The SIR measurement portion 2c measures the power ratio SIR (Signal to Interference Power Ratio) of the received signal to the interference signal. The comparison portion 2d compares the target SIR and measured SIR, and if the measured SIR is higher than the target SIR creates a command ("down" command) to lower the transmission power using TPC (Transmission Power Control) bits, but if the measured SIR is lower than the target SIR creates a command ("up" command) to raise the transmission power using TPC bits. The target SIR is the SIR value necessary to obtain, for example, $10^{-3}$ (the occurrence of errors once every 1000 times), and is input to the comparison portion 2d from the target SIR setting portion 2e. The spreading modulation portion 2f performs spreading modulation of the transmission data and TPC bits. After spreading modulation, the base station 2 performs DA conversion, orthogonal modulation, frequency conversion, power amplification, and other processing, and transmits the data from an antenna to the mobile terminal 4. The despreading portion 4c of the mobile terminal 4 performs despreading processing of the signal received from the base station 2, the demodulation portion 4d demodulates the received data and TPC bits, and the transmission power of the power amplifier 4b is controlled according to the command indicated by the TPC bits.

Figure 9:
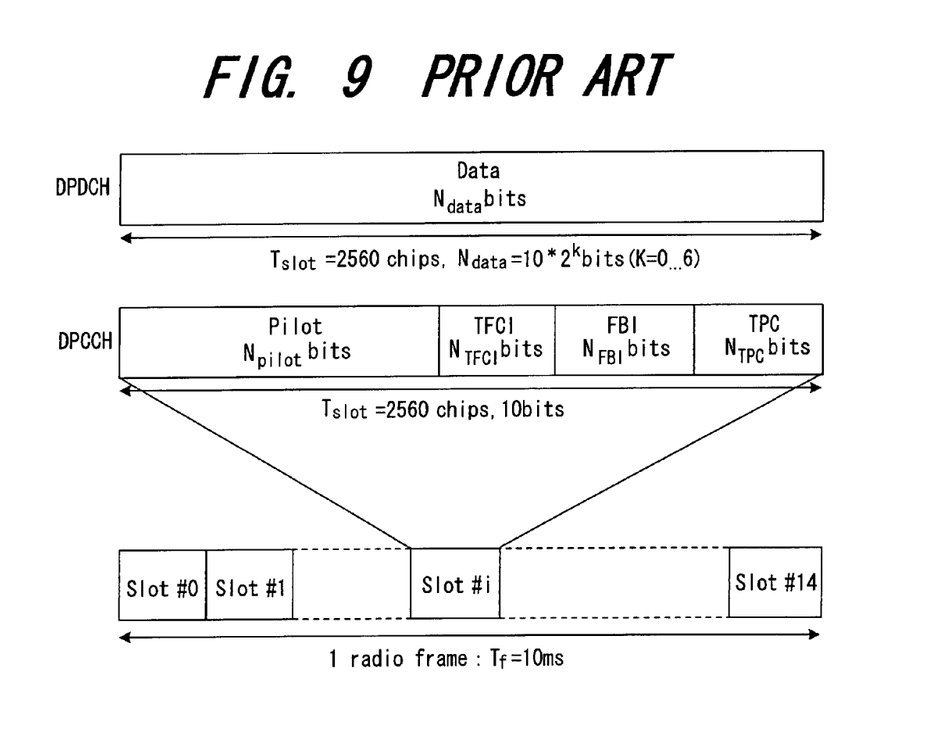
FIG. 9 shows the configuration of an uplink UL physical channel DPCH frame.
Figure 10:
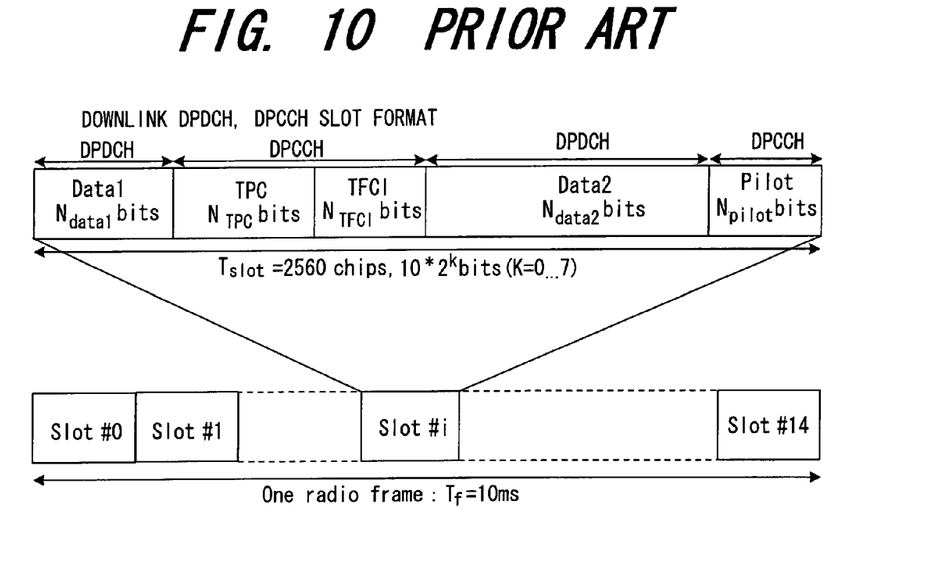
FIG. 10 shows the configuration of a downlink DL physical channel DPCH frame.

FIG. 9 and FIG. 10 shows DPCH (Dedicated Physical Channel) frame formats of uplink (UL) and downlink (DL) physical channels, respectively, standardized by 3GPP. Downlink (DL) indicates the direction of data transmitted from the base station to the mobile terminal; uplink (UL) indicates the direction of data transmitted in the opposite direction, from the mobile terminal to the base station.

In FIG. 9, an uplink frame has a dedicated data channel (DPDCH, Dedicated Physical Data Channel) and a dedicated control channel (DPCCH, Dedicated Physical Control Channel). The dedicated data channel DPDCH transmits only transmission data; the dedicated control channel multiplexes and transmits pilot signals, TPC bit information, and other control data. One uplink frame comprises 15 slots (slot #0 to slot #14) in 10 msec. Each of the slots in the dedicated control channel DPCCH comprises 10 bits; the symbol rate is fixed at 15 ksps, and pilot signals, transmission power control data TPC, transport format combination indicator TFCI, and feedback information FBI are transmitted.

In FIG. 10, the downlink frame comprises 15 slots #0 to #14, with one frame=10 msec; each slot has a dedicated physical data channel DPDCH which transmits a first data portion Data1 and a second data portion Data2, and a dedicated physical control channel DPCCH which transmits pilot signals, TPC, and TFCI, using time-division multiplexing.

To summarize the above, uplink power transmission control in current W-CDMA 3GPP systems is performed as follows. At the initiation of communication, the mobile terminal 4 initiates communication by an initial power which is based on a provisional value determined by regulation according to a communication startup sequence (open-loop control), and thereafter, said up/down control of the transmission power is performed based on TPC bits sent continuously from the base station 2 in each slot (closed-loop control). By this means, the SIR value, in the reception portion of the base station 2, of pilot signals transmitted by the mobile terminal 4 are made equal to a prescribed target SIR.

However, in a fourth-generation mobile communication system and other radio packet transmission systems, data packet transmission may not be executed continuously. It is anticipated that, from the standpoint of effective utilization of radio interval resources during periods (transmission interruption periods) in which data packet transmission is not performed, systems will be designed so as to reduce the transmission of control packets insofar as possible.

Transmission power control for uplink UL transmission is based on the pilot signal transmitted in the uplink direction. But in the above fourth-generation mobile communication system, the pilot signals may not be transmitted during transmission interruption periods. Consequently during transmission interruption periods when uplink packet transmission is not performed, uplink transmission power control is no longer continuous, and the problem arises that transmission power values may be inappropriate at the time of resumption of data packet transmission.

Figure 11:
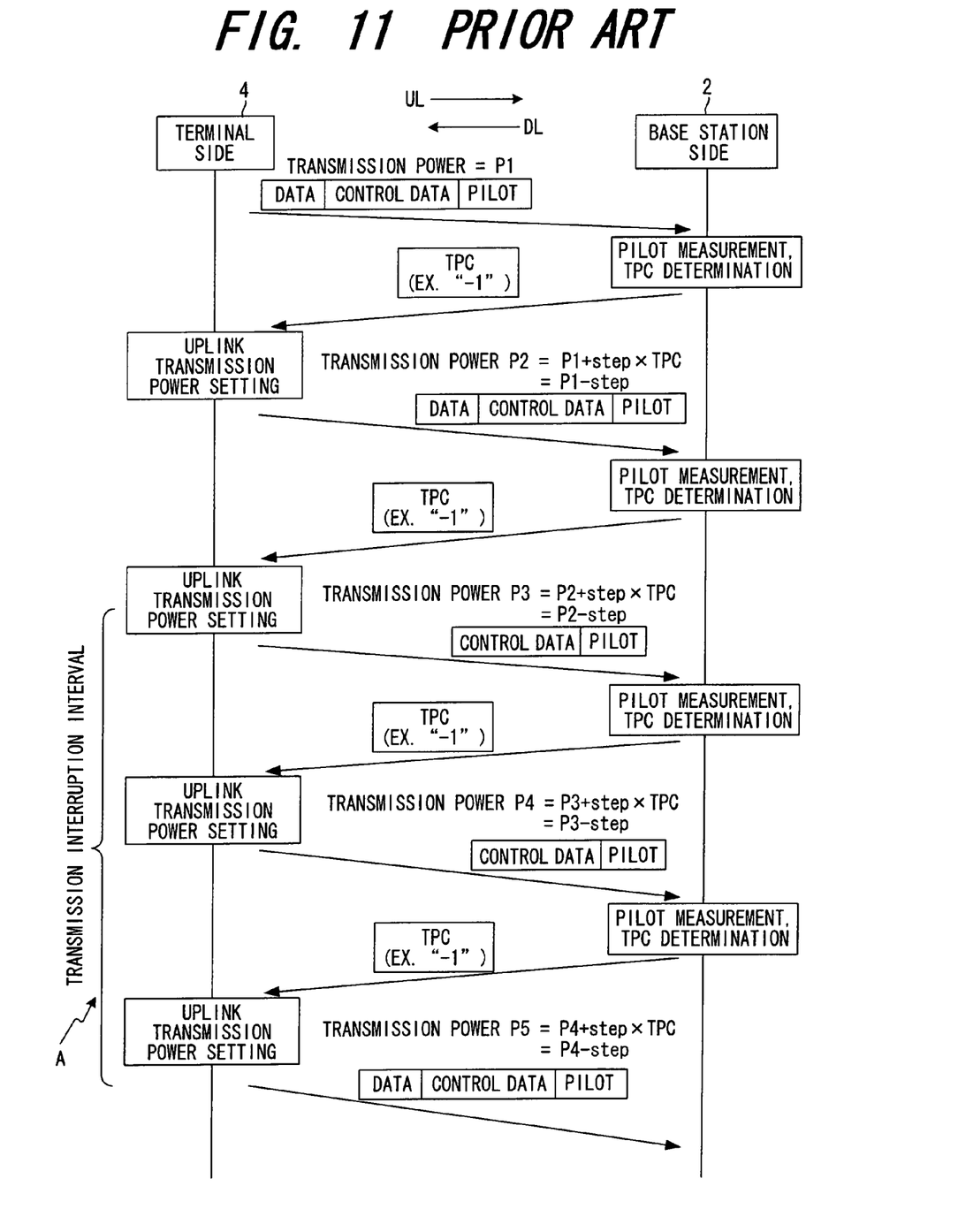
FIG. 11 is an explanatory diagram of transmission power control of the prior art; and, FIG. 12 is an explanatory diagram of another transmission power control sequence of the prior art.

In order to perform transmission at an appropriate transmission power even when data packet transmission is resumed, a mobile terminal 4 must continue to send a pilot signal to the base station 2 in the uplink UL direction even when packets are not being transmitted (transmission interruption interval A), as shown in FIG. 11, and at the same time, must continue to receive TPC commands from the base station 2. However, this method has the problem that efficient utilization of the radio interval is not possible.

Further, it is conceivable that, at the time of data packet transmission resumption, a transmission power value stipulated by specifications may be used. However, there is the possibility that the power value may deviate greatly from the value actually required. In this case, if the transmission power value stipulated by specifications is smaller than the value actually required, there arises the possibility that at the time of resumption of data packet transmission, transmitted data packets cannot be properly received and decoded by the base station; conversely, if the value is larger than the value actually required, the possibility that the base station will succeed in reception and decoding is increased, but increased occurrence of interference due to excessive power becomes a problem.

There exists a transmission power determination method in which, when determining the transmission power value at the time of transmission initiation, parameters of an equation to calculate the transmission power are changed (See JP2000-332682A). In this transmission power determination method (Prior Art Method 1), when the transmission power is determined using the equation Transmission power=Immediately preceding transmission power+TPC×Δ (where Δ is an increase/decrease step width)

the increase/decrease step width Δ is changed according to the environment conditions and terminal movement speed, so that for example Δ is increased when the terminal movement speed is high.

However, in this Prior Art Method 1, the transmission power at the time of transmission resumption is not determined taking into account the communication states at the time of the start of transmission interruption and at the time of transmission resumption, and so the problem occurs that transmission is not performed at an appropriate transmission power when transmission is resumed. In particular, the longer the period from interruption to resumption, the lower is the reliability of the transmission power provided by the above equation.

Figure 12:
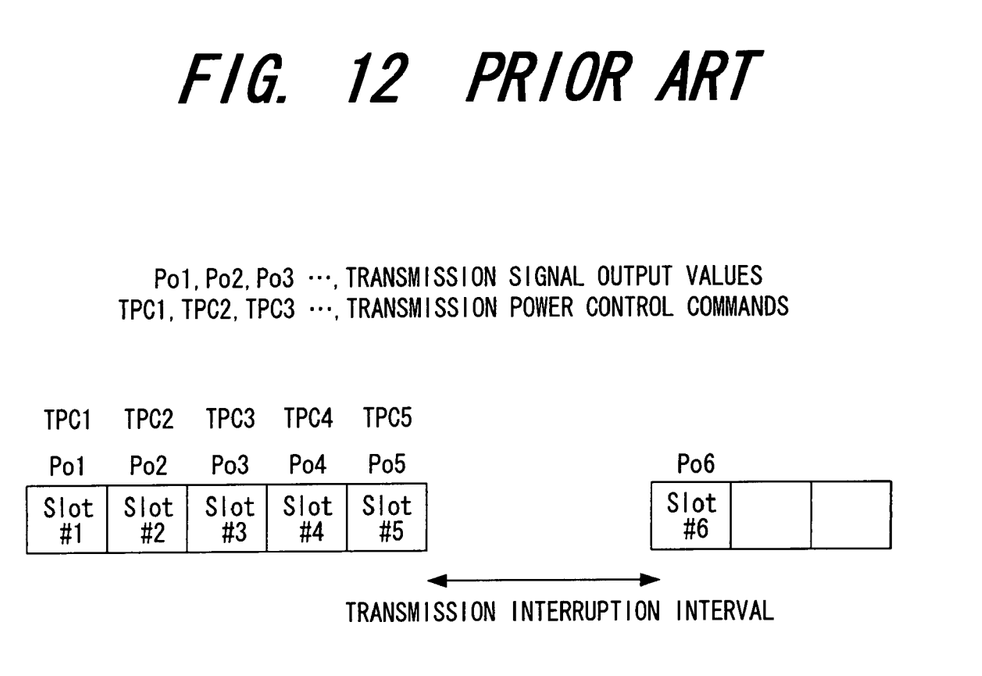

There exists a transmission power determination method in which, when determining the transmission power value at the time of initiation of transmission, the transmission power immediately preceding transmission interruption is taken into account (See Tokuhyo 2002-535872 corresponding to International Publication No. W00/42717). In this transmission power determination method (Prior Art Method 2), when determining the transmission power P06 at the time of transmission resumption as shown in FIG. 12, the transmission power can be determined using the following equation, based on the transmission signal outputs (P01, P02, P03, P04, P05) used in certain fixed intervals (in the figure, slot #1 to slot #5) immediately preceding transmission interruption, or on transmission power command values (TPC1, TPC2, TPC3, TPC4, TPC5).

$P06 = P05 + Poffset$ $Poffset = f(P01, P02, P03, P04, P05)$ or $Poffset = f(P01, P02, P03, P04, P05, TPC1, TPC2, TPC3, TPC4, TPC5)$ Here f(•) denotes a function which takes • as a variable.

However, this method assumes that the transmission interruption period is short (for example, 5 to 6 ms or less), and uses the transmission powers or transmission power command values for fixed intervals immediately preceding transmission interruption, and so there is the problem that at the time of transmission resumption, transmission at an appropriate transmission power is not possible. In particular, the longer the period from interruption to resumption, the lower is the reliability of the transmission power given by the above equation.

SUMMARY OF THE INVENTION

In light of the above, an object of this invention is to enable resumption of transmission of uplink data packets at an appropriate transmission power at the time of transmission resumption, even when TPC commands are not received (or, TPC commands are not transmitted by the base station) during the period in which uplink data packet transmission is interrupted.

This invention relates to a transmission power control method in which a base station creates and transmits power control data to a mobile terminal at each prescribed time slot based on signals received from the mobile terminal, and the mobile terminal controls the transmission power of signals to the base station based on the power control data.

A first transmission power control method has a step of measuring the reception level of common pilot signals transmitted from a base station at each time slot; a step of storing, at the time of interruption of signal transmission to the base station, the transmission power and the reception level of the common pilot signals in the immediately preceding time slot; and a step adding, at the time of resumption of transmission to the base station, the difference between the common pilot signal reception level at the time of transmission resumption and the stored reception level to the stored transmission power, and using the power obtained by this addition as the signal transmission power at the time of transmission resumption.

A second transmission power control method has a step of measuring the reception level of common pilot signals transmitted from a base station at each time slot, and of calculating a moving average of the reception level over a plurality of time slots at each time slot; a step of storing, at the time of interruption of signal transmission to the base station, the transmission power and the moving average in the immediately preceding time slot; and a step of adding, at the time of resumption of transmission to the base station, the difference between the moving average at the time of transmission resumption and the stored moving average to the stored transmission power, and using the power obtained by this addition as the signal transmission power at the time of transmission resumption.

The first and second transmission power control methods further have a step of correcting the signal transmission power at the time of resumption of transmission, according to the difference between the frequency of downlink RF signals from the base station to the mobile terminal and the frequency of uplink RF signals from the mobile terminal to the base station.

The first and second transmission power control methods further have a step of estimating the movement speed of the mobile terminal and a step, based on the movement speed, of controlling the number of time slots for calculation of the moving average.

This invention relates to a mobile terminal apparatus in a radio communication system in which a base station creates and transmits, to the mobile terminal power, power control data at each prescribed time slot based on signals received from the mobile terminal and the mobile terminal controls the transmission power of signals transmitted to the base station based on the power control data.

A first mobile terminal comprises a reception level measurement unit which measures the reception level of common pilot signals transmitted from a base station at each time slot; a storage unit which, at the time of interruption of signal transmission to the base station, stores the transmission power and the reception level of the common pilot signals in the immediately preceding time slot; and a transmission power determination unit which, at the time of resumption of transmission to the base station, adds the difference between the reception level of the common pilot signal at the time of resumption of transmission and the stored reception level to the stored transmission power, and uses the power obtained by this addition as the signal transmission power at the time of transmission resumption.

A second mobile terminal comprises a moving average calculation unit which measures the reception level of common pilot signals transmitted from the base station at each time slot, and calculates a moving average of the reception level over a plurality of time slots at each time slot; a storage unit which, at the time of interruption of signal transmission to the base station, stores the transmission power and the moving average in the immediately preceding time slot; and a transmission power determination unit which, at the time of resumption of transmission to the base station, adds the difference between the moving average at the time of transmission resumption and the stored moving average to the stored transmission power, and uses the power obtained by this addition as the signal transmission power at the time of transmission resumption.

The first and second mobile terminals further comprise a correction unit which corrects the signal transmission power at the time of transmission resumption according to the difference between the frequency of downlink RF signals from the base station to the mobile terminal and the frequency of uplink RF signals from the mobile terminal to the base station.

The first and second mobile terminals further comprise a movement speed estimation unit which estimates the movement speed of the mobile terminal, wherein the moving average calculation unit changes the number of time slots to calculate the moving average, based on the movement speed.

By means of this invention, even when TPC commands are not received during interruption of uplink data packet transmission, data packet transmission can be resumed at an appropriate transmission power. Further, by means of this invention, effective utilization of radio intervals is possible, and moreover the probability of correct reception of data packets by the base station at the time of transmission resumption is increased, and the occurrence of interference due to excessive power can be prevented.

DESCRIPTION OF THE PREFERRED EMBODIMENTS (A) First Embodiment (a) Configuration

Figure 1:
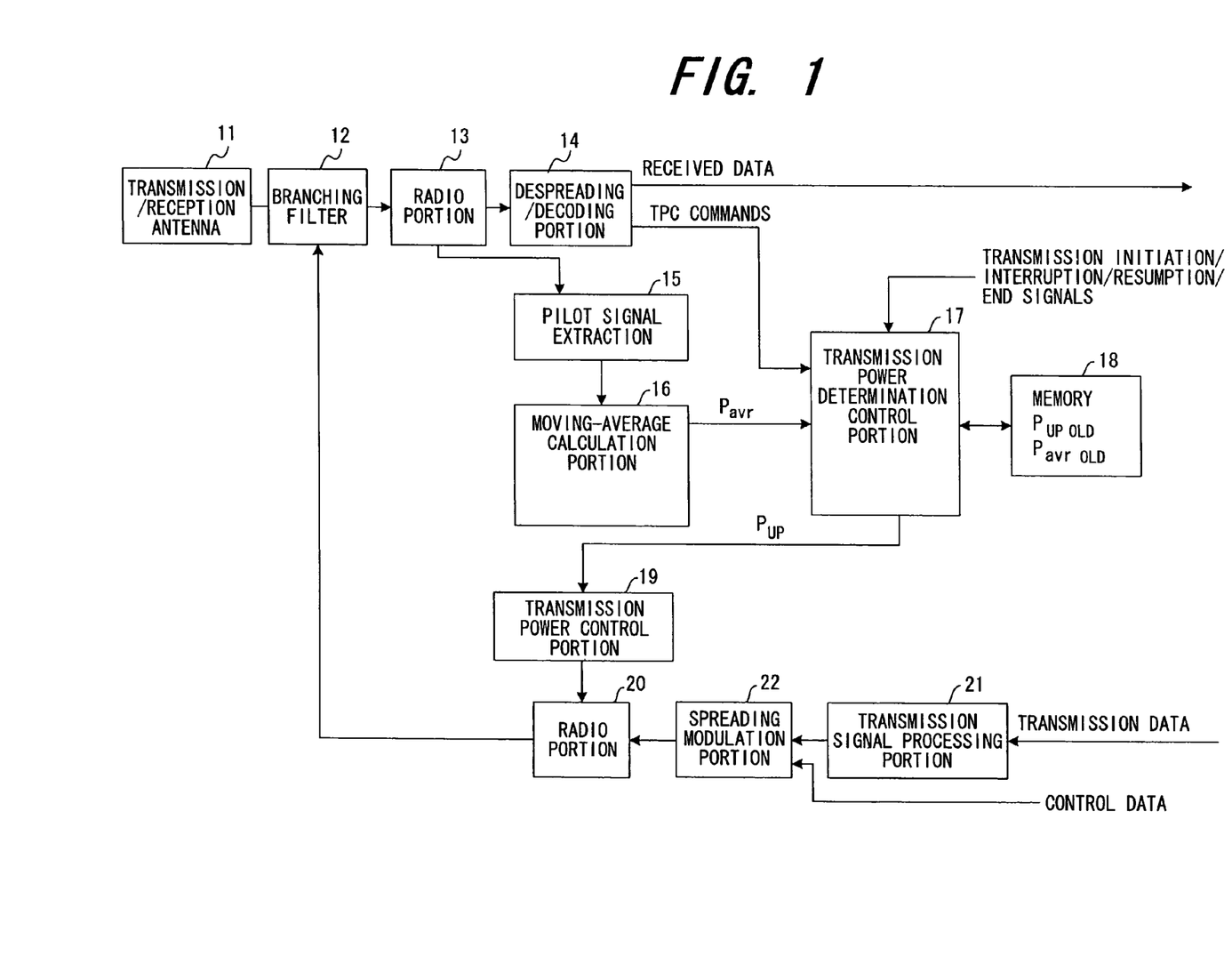
FIG. 1 shows the configuration of principal portions of a mobile terminal comprising transmission power control functions of this invention.
Figure 2:
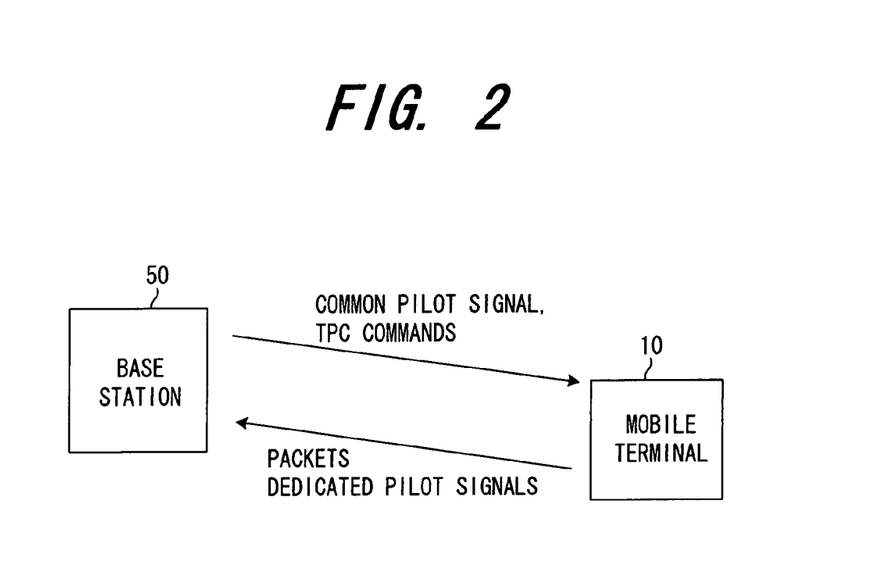
FIG. 2 is an explanatory diagram of uplink and downlink transmission and reception signals.

FIG. 1 shows the configuration of principal portions of a mobile terminal comprising transmission power control functions of this invention, and FIG. 2 is an explanatory diagram of uplink and downlink transmission and reception signals.

As shown in FIG. 2, similarly to the technology of the prior art in FIG. 7, the base station 50 measures reception quality based on dedicated pilot signals received from the mobile terminal 10, and creates and transmits to the mobile terminal 10, via the dedicated physical channel DPCH, TPC bits (TPC commands) at each slot, such that the measured reception quality approaches a target reception quality. In addition, the base station 50 constantly transmits a common pilot signal via the common pilot channel CPICH.

The transmission/reception antenna 11 (FIG. 1) of the mobile terminal 10 receives signals transmitted from the base station 50, and inputs the received signals to a radio portion 13 via a branching filter 12. The radio portion 13 down-converts the RF signal frequency to the baseband frequency, and then performs orthogonal demodulation and inputs the result to a despreading/decoding portion 14 and pilot signal extraction portion 15. The despreading/decoding portion 14 performs despreading using a prescribed spreading code, and performs decoding processing of the result of despreading, to output the received data and control data (TPC commands and similar) for the dedicated physical channel. The pilot signal extraction portion 15 performs despreading using a prescribed spreading code, extracts the common pilot signal, transmitted always from the base station using the common pilot channel CPICH, and inputs the result to the moving-average calculation portion 16. The moving-average calculation portion 16 measures the reception level of the common pilot signal transmitted from the base station at each slot, calculates the moving average Pavr of the reception level for the most recent n slots at each slot, and inputs the result to the transmission power determination control portion 17. The moving average Pavr is given as follows, where the reception level of the most recent n slots is Po1 to Pon:

$$P\text{avr}=(Po1+Po2+\ldots+Pon)/n$$

At the time of initiation of communication, the transmission power determination control portion 17 sets the transmission power $P_{UP}$ to the transmission power value stipulated by the specifications, and during transmission, uses the following equation to determine the transmission power.

$$P_{UP}=P_{UP}(\text{transmission power of immediately preceding slot})+\Delta\times\text{TPC} \qquad (1)$$

TPC takes one of the values −1, 0, +1; Δ is an increase/decrease step width. At the time of transmission interruption, the transmission power determination control portion 17 stores in memory 18, as $P_{UP\_OLD}$, the transmission power $P_{UP}$, and as $Pavr_{OLD}$, the moving average Pavr, in the slot immediately preceding interruption so as to enable calculation of the transmission power at the time of transmission resumption. At the time of resumption of transmission to the base station, the transmission power determination control portion 17 determines the difference Poffset between the latest moving average Pavr at the time of transmission resumption and the moving average $Pavr_{OLD}$, stored in memory 18, at the time of transmission interruption, and then adds this difference Poffset to the transmission power $P_{UP\_OLD}$, stored in memory 18, at the time of transmission interruption, to determine the transmission power $P_{UP}$ at the time of transmission resumption. That is, the transmission power determination portion 17 uses the following equations $$Poffset = Pavr - Pavr_{OLD} \quad (2)$$

$$P_{UP} = Pavr_{OLD} + Poffset \quad (3)$$

to determine the transmission power $P_{UP}$ at the time of transmission resumption, and inputs this to the transmission power control portion 19.

The transmission power control portion 19 controls the gain of a power amplifier, not shown, in the radio portion 20 so as to perform transmission using the input transmission power. The transmission signal processing portion 21 encodes the transmission data and control data for error correction and decode and performs other processing. The spreading modulation portion 22 performs spreading processing using a prescribed spreading code of the transmission data and control data, inputting these as orthogonal signals to the radio portion 20. The radio portion 20 performs orthogonal modulation, frequency conversion, and power amplification control, and transmits the data to the base station via a branching filter 12 and antenna 11.

(b) Reception Level

Figure 3:
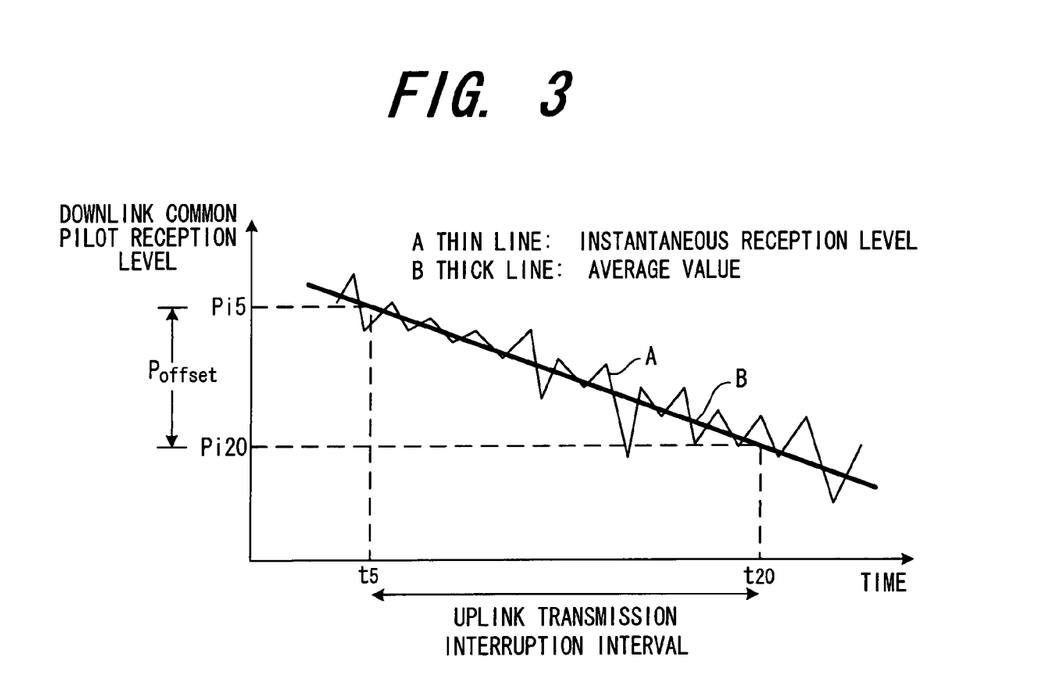
FIG. 3 is an explanatory diagram of common pilot signal reception levels in downlink DL transmission.

FIG. 3 is an explanatory diagram of common pilot signal reception levels in downlink DL transmission; the horizontal axis indicates time, and the vertical axis indicates the reception level of the common pilot signal. The reception level increases and decreases depending on the distance between the base station and the mobile terminal; the shorter the distance, the higher is the reception level. The reception level also fluctuates depending on the fading environment. Hence, when for example the mobile terminal is moving away from the base station, the reception level declines with time overall, while fluctuating according to the fading environment, as indicated by curve A in FIG. 3. The fluctuations in reception level can be made smaller by taking a moving average, as indicated by curve B. From the above, at each slot the moving-average calculation portion 16 uses the reception level for the prescribed most recent slots to compute the moving average Pavr and input the result to the transmission power determination control portion 17. A configuration may also be employed in which, in an environment in which the reception level does not fluctuate, or the fluctuation is slight, there is no need for a moving average, and the moving-average calculation portion 16 inputs the instantaneous reception level to the transmission power determination control portion 17.

(c) Transmission Power Control

If the uplink transmission frequency $f_{UL}$ and downlink DL transmission frequency $f_{DL}$ are different, the fading environments for uplink UL and downlink DL transmission will not be the same accurately. However, when the frequency ratio $((f_{DL} - f_{UL})/f_{DL})$ is equal to or less than a prescribed value (approximately 10% or less), as for example when $f_{UL} = 1.9$ GHz and $f_{DL} = 2.1$ GHz, then the average values of reception levels at the base station and at the mobile terminal can be regarded as substantially the same. Hence the difference Poffset in the averages values of reception levels at the mobile terminal at the times of transmission resumption and transmission interruption can be regarded as the difference in average values of the reception level received by the base station from the mobile terminal at the time of transmission resumption and at the time transmission stops. And, it can be inferred that the base station indicates to the mobile station, using TPC bits, increases and decreases in power equivalent to this Poffset, if there is no interruption.

Thus in this invention, the difference Poffset in average values (moving average difference) is calculated using equation (2), and the transmission power $P_{UP}$ at the time of transmission resumption is determined using equation (3). In the example of FIG. 3, the difference Poffset (negative) between the moving average Pi20 at the transmission resumption time t20 and the moving average Pi5 at the transmission interruption time t5 is added to the transmission power at the transmission interruption time t5 and used as the transmission power $P_{UL}$ at the time of transmission resumption. In other words, in the example of FIG. 3 the transmission power at the time transmission is resumed is lowered by the amount |Poffset| from the transmission power $P_{UP\_OLD}$ at the time of transmission interruption, and transmission is resumed by the mobile terminal. Here, the value of Poffset calculated using equation (2) can be corrected taking into consideration the downlink and uplink frequency difference. Normally radio transmission environment, is often not as anticipated, and it is not easy to uniquely define the relation between the RF frequency and radio transmission loss which generates between base station and mobile terminal, so that often an approximating equation based on experimental results is used. According to the present invention, a simple correction can be performed by multiplying $f_{UL}/f_{DL}$ by P of f set.

(d) Transmission Power Determination Control Processing

Figure 4:
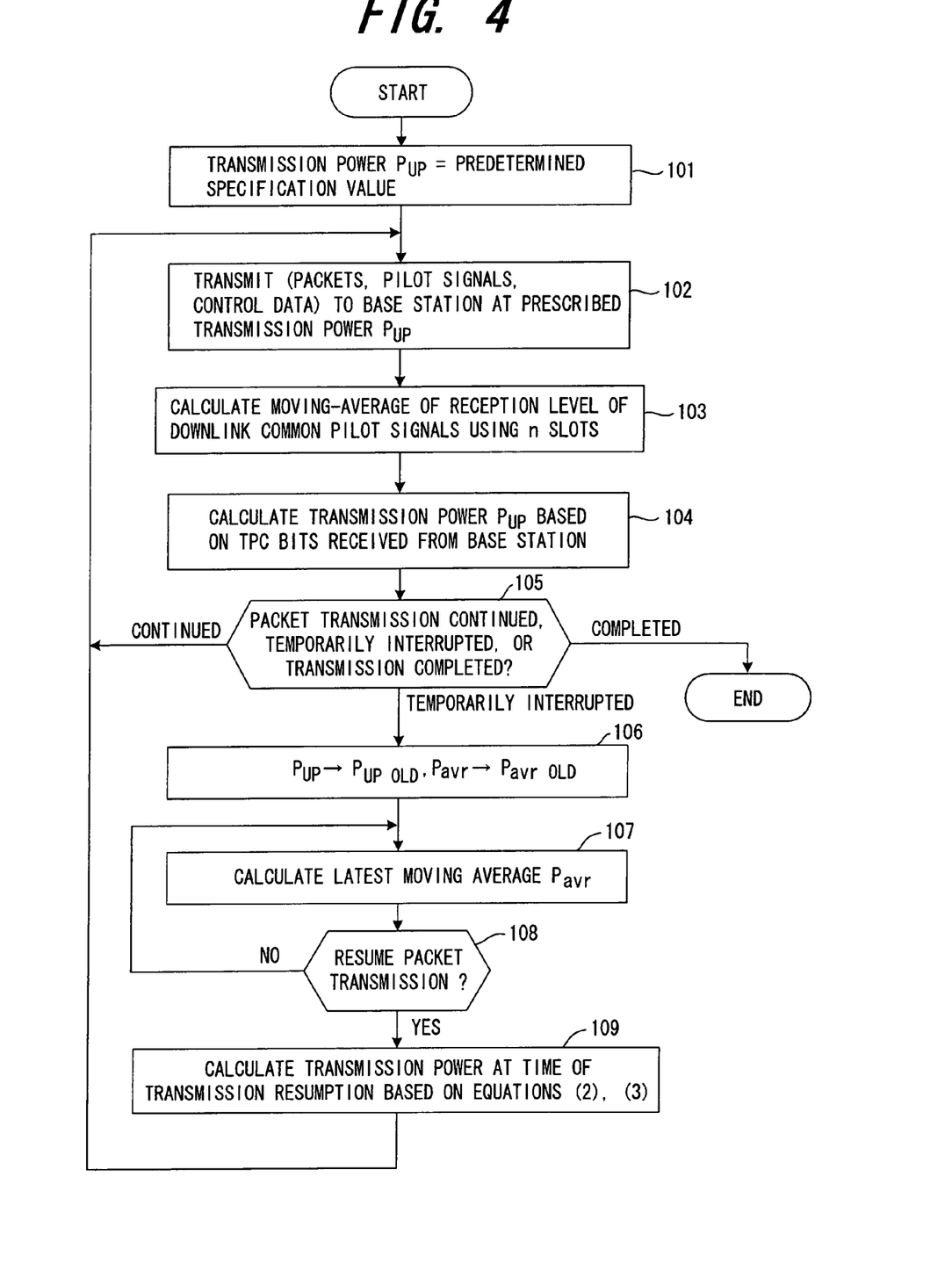
FIG. 4 shows the flow of transmission power determination control processing in a mobile terminal of this invention.

FIG. 4 shows the flow of transmission power determination control processing in a mobile terminal of this invention.

At the time communication is initiated, the transmission power determination control portion 17 of the mobile terminal inputs the transmission power stipulated by the specifications to the transmission power control portion 19 as the transmission power $P_{UP}$ (step 101), and the transmission power control portion 19 transmits signals (packets, pilot signals, control data) to the base station at this transmission power $P_{UP}$ (step 102). That is, At the initiation of communication, transmission is initiated using a transmission signal output initial value based on an existing specification value, as in current 3GPP systems.

In parallel with the above, the moving-average calculation portion 16 calculates the moving average for each slot, using the reception levels of the downlink common pilot signal for the most recent n slots, and inputs this to the transmission power determination control portion 17 (step 103).

During transmission, after receiving a TPC command from the base station at each slot, the transmission power determination control portion 17 uses the following equation at each slot to determine the transmission power $P_{UP}$ (step 104).

$P_{UP}=P_{UP}$(transmission power of immediately preceding slot)$+\Delta \times$TPC Then, the transmission power determination control portion 17 judges whether packet transmission is being continued, or packet transmission has been temporarily interrupted, or transmission has been completed, based on a signal from a transmission control portion (not shown) (step 105), and if transmission has been completed, processing ends, but if packet transmission is being continued, the transmission power $P_{UP}$ determined in step 104 is input to the transmission power control portion 19. The transmission power control portion 19 transmits signals (packets, pilot signals, control data) to the base station at this transmission power $P_{UP}$ (step 102). Thereafter, the processing of step 103 and subsequent steps is repeated.

On the other hand, if in step 105 packet transmission is temporarily interrupted, the transmission power $P_{UP}$ calculated in step 104 is stored in memory 18 as $P_{UP\_OLD}$, and the moving average Pavr calculated in step 103 is stored in memory 18 as $Pavr_{OLD}$ (step 106).

Then, the latest moving average Pavr is calculated (step 107), and monitoring for the resumption of packet transmission is performed (step 108); if packet transmission is not resumed, step 107 and subsequent processing is repeated, and if packet transmission is resumed, the transmission power $P_{UP}$ at the time of transmission resumption is determined according to equations (2) and (3), and is input to the transmission power control portion 19 (step 109). The transmission power control portion 19 transmits signals (packets, pilot signals, control data) to the base station at this transmission power $P_{UP}$ (step 102), and thereafter, the processing of step 103 and subsequent steps is repeated.

According to the above first embodiment, even when TPC commands are not received while uplink data packet transmission is interrupted, data packet transmission can be resumed at an appropriate transmission power. Further, by means of the first embodiment, effective utilization of the radio interval is possible, and moreover the probability of correctly receiving data packets at the base station when transmission is resumed is increased, and the occurrence of interference due to excessive power can be prevented.

(B) Second Embodiment

Figure 5:
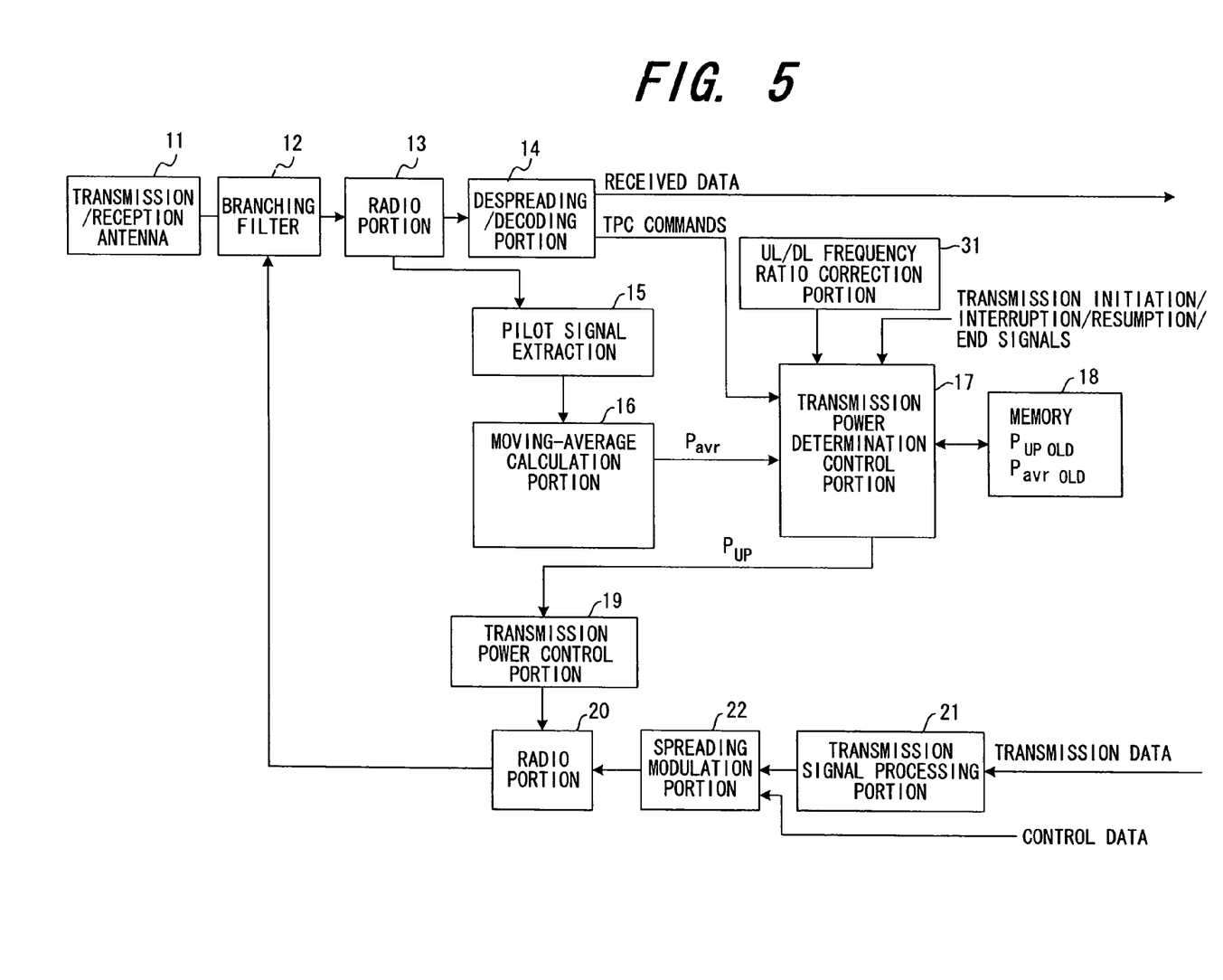
FIG. 5 shows the configuration of a second embodiment of the invention.

FIG. 5 shows the configuration of a second embodiment of the invention; portions which are the same as in the first embodiment are assigned the same symbols. A difference with the first embodiment is the fact that an UL/DL frequency ratio correction portion 31 is provided, which corrects the signal transmission power $P_{UP}$ at the time transmission is resumed according to the ratio of the RF signal frequency of downlink DL transmission from the base station to the mobile terminal, to the RF signal frequency of uplink UL transmission from the mobile terminal to the base station.

Even when there is a difference between the downlink DL RF signal frequency and the uplink UL RF signal frequency, if the ratio of the two frequencies is nearly equal to 1, then the moving average values Pavr of the reception levels at the base station and at the mobile terminal are substantially the same, and the transmission power at the time of transmission resumption can be determined based on equations (2) and (3). However, if the frequency ratio deviates greatly from 1, transmission losses differ somewhat, a difference arises in the moving averages Pavr of the reception levels at the base station and at the mobile station, and the transmission power $P_{UP}$ can no longer be correctly calculated.

Hence the UL/DL frequency ratio correction portion 31 corrects the transmission power $P_{UP}$ calculated using equations (2) and (3), based on the magnitude of the frequency ratio. As the correction method, for example, correction is performed by multiplying $f_{UL}/f_{DL}$ by Poffset.

By means of the second embodiment, the transmission power $P_{UP}$ is corrected based on the magnitude of the ratio of the downlink DL RF signal frequency to the uplink UL RF signal frequency, so that even when the frequency difference is large, the transmission power $P_{UP}$ can be calculated correctly to resume transmission, the probability that the base station can correctly receive data packets at the time of transmission resumption is increased, and the occurrence of interference due to excessive power can be prevented.

(C) Third Embodiment

Figure 6:
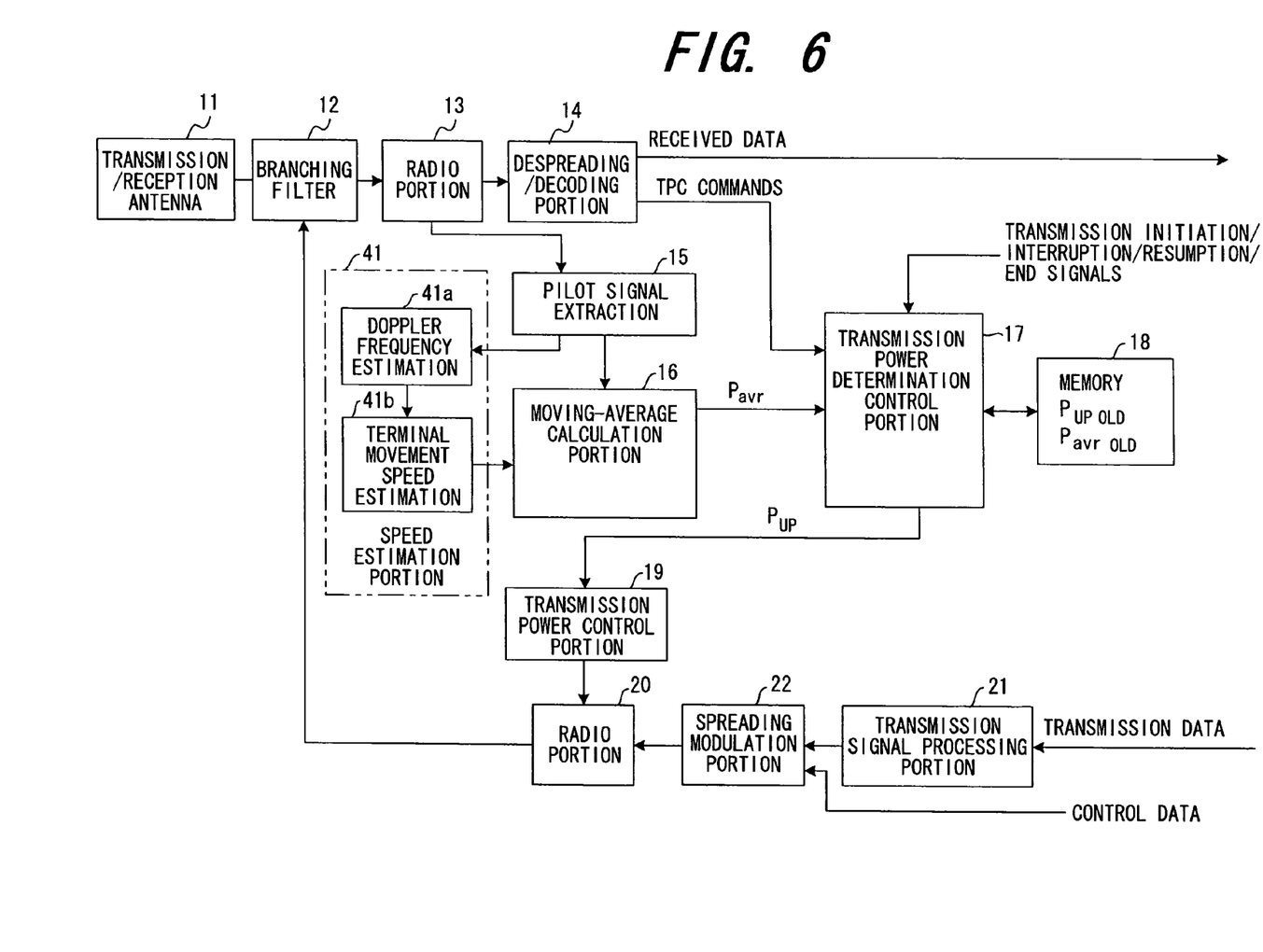
FIG. 6 shows the configuration of a third embodiment of the invention.

FIG. 6 shows the configuration of a third embodiment of the invention; portions which are the same as in the first embodiment are assigned the same symbols. A difference with the first embodiment is the fact that the average number (number of slots) used when averaging the reception level of the common pilot signal is made variable. The fading environment (fading frequency) fluctuates according to the movement speed of the mobile terminal; the common pilot signal reception level changes greatly as the movement speed increases. Hence when the movement speed of the mobile terminal is slow, the number of slots used in calculating the moving average is reduced, and when the movement speed is fast, the number of slots used in calculating the moving average is increased.

By this means, when the movement speed is slower the number of slots used in calculating the moving average is reduced, so that accurate and responsive control is possible; and when the movement speed is faster the number of slots used in calculating the moving average is increased, so that accurate control is possible.

From the above, a Doppler frequency estimation portion 41a of a speed measurement portion 41 uses the common pilot signal to estimate the Doppler frequency, and a terminal movement speed estimation portion 41b estimates the movement speed of the mobile terminal based on the estimated Doppler frequency, and inputs the result to the moving-average calculation portion 16. The moving-average calculation portion 16 controls the number of slots used in moving average calculations according to the movement speed of the mobile terminal.

From the above, by means of this invention, even when TPC commands are not received during interruption of uplink data packet transmission, data packet transmission can be resumed at an appropriate transmission power. Moreover, by means of this invention, effective utilization of a radio interval is possible, the probability that a data packet can be received correctly by the base station at the time of transmission resumption is increased, and the occurrence of interference due to excessive power can be prevented.

What is claimed is:

1. A transmission power control method in which a base station creates and transmits power control data to a mobile terminal at each prescribed time slot based on signals received from the mobile terminal and the mobile terminal controls the transmission power of signals to the base station based on the power control data, the method comprising the steps of:

measuring the reception level of common pilot signals transmitted from the base station at each time slot;

storing, at the time of interruption of signal transmission to the base station, the transmission power and the reception level of the common pilot signals for the immediately preceding time slot; and adding, at the time of resumption of transmission to the base station, the difference between the common pilot signal reception level at the time of transmission resumption and said stored reception level to said stored transmission power, and using the power obtained by said addition as the signal transmission power at the time of transmission resumption.

2. The transmission power control method according to claim 1, wherein:

the base station measures reception quality based on signals received from the mobile terminal, creates and transmits the power control data to the mobile station at each time slot such that the measured reception quality coincides with a target reception quality, and at the time of interruption of transmission to the base station, the base station does not transmit the power control data to the mobile terminal.

3. The transmission power control method according to claim 1, further comprising a step of correcting the signal transmission power at the time of transmission resumption according to the ratio of the downlink RF signal frequency from the base station to the mobile terminal, to the uplink RF signal frequency from the mobile terminal to the base station.

4. A transmission power control method in which a base station creates and transmits power control data to a mobile terminal at each prescribed time slot based on signals received from the mobile terminal and the mobile terminal controls the transmission power of signals to the base station based on the power control data, the method comprising the steps of:

measuring the reception level of common pilot signals transmitted from the base station at each time slot, and calculating a moving average of the reception level of a plurality of time slots at each time slot;

storing, at the time of interruption of signal transmission to the base station, the transmission power and the moving average for the immediately preceding time slot; and adding, at the time of resumption of transmission to the base station, the difference between the moving average at the time of transmission resumption and said stored moving average to said stored transmission power, and using the power obtained by said addition as the signal transmission power at the time of transmission resumption.

5. The transmission power control method for a mobile terminal according to claim 4, further comprising a step of: estimating the movement speed of the mobile terminal; and controlling the number of time slots used in calculating the moving average based on the movement speed.

6. A mobile terminal in a radio communication system in which a base station creates and transmits, to the mobile terminal, power control data at each prescribed time slot based on signals received from the mobile terminal, and the mobile terminal controls the transmission power of signals transmitted to the base station based on the power control data comprising:

a reception level measurement unit which measures the reception level of common pilot signals transmitted from the base station at each time slot;

a storage unit which, at the time of interruption of signal transmission to the base station, stores the transmission power and the reception level of the common pilot signals for the immediately preceding time slot; and a transmission power determination unit which, at the time of resumption of transmission to the base station, adds the difference between the reception level of the common pilot signal at the time of resumption of transmission and said stored reception level to said stored transmission power, and uses the power obtained by said addition as the signal transmission power at the time of transmission resumption.

7. The mobile terminal according to claim 6, wherein the transmission power determination unit determines the transmission power based on the power control data received from the base station during signal transmission to the base station, and, during interruption of transmission to the base station, interrupts the determination of the transmission power using the power control data.

8. The mobile terminal according to claim 6, further comprising a correction unit which corrects the signal transmission power at the time of transmission resumption according to the ratio of the downlink RF signal frequency from the base station to the mobile terminal, to the uplink RF signal frequency from the mobile terminal to the base station.

9. A mobile terminal in a radio communication system in which a base station creates and transmits, to the mobile terminal, power control data at each prescribed time slot based on signals received from the mobile terminal and the mobile terminal controls the transmission power of signals transmitted to the base station based on the power control data, comprising:

a moving average calculation unit which measures the reception level of common pilot signals transmitted from the base station at each time slot, and calculates the reception a moving average of the reception level for a plurality of time slots at each time slot;

a storage unit which, at the time of interruption of transmission to the base station, stores the transmission power and the moving average for the immediately preceding time slot; and a transmission power determination unit which, at the time of resumption of transmission to the base station, adds the difference between the moving average at the time of resumption of transmission and said stored moving average to said stored transmission power, and uses the power obtained by said addition as the signal transmission power at the time of transmission resumption.

10. The mobile terminal according to claim 9, further comprising a movement speed estimation unit which estimates the movement speed of the mobile terminal, wherein the moving average calculation unit changes the number of time slots to calculate the moving average based on the movement speed.

* * * * *

UNITED STATES PATENT AND TRADEMARK OFFICE
CERTIFICATE OF CORRECTION

PATENT NO.        : 7,702,354 B2
APPLICATION NO.   : 11/826118
DATED             : April 20, 2010
INVENTOR(S)       : Yoshihiro Kawasaki It is certified that error appears in the above-identified patent and that said Letters Patent is hereby corrected as shown below:

On the title page insert the following:

-- (22) PCT Filed:     Jan 24, 2005

(86) PCT No.:       PCT/JP2005/000840
        371 (c)(1),
        (2), (4) Date:    July 12, 2007

(87) PCT Pub. No.   WO2006/077647
        PCT Pub. Date: Jul. 27, 2006 --.

On the title page insert item (63), Related U.S. Application Data

-- (63)  Continuation of application No. PCT/JP05/00840, filed on Jan. 24, 2005 --.

Signed and Sealed this
Seventeenth Day of May, 2011

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,702,354 B2 | |
| APPLICATION NO. | : 11/826118 | |
| DATED | : April 20, 2010 | |
| INVENTOR(S) | : Yoshihiro Kawasaki | |

It is certified that error appears in the above-identified patent and that said Letters Patent is hereby corrected as shown below:

On the title page insert item (63), Related U.S. Application Data

-- (63) Continuation of application No. PCT/JP05/00840, filed on Jan. 24, 2005 --.

This certificate supersedes the Certificate of Correction issued May 17, 2011.

Signed and Sealed this
Twenty-eighth Day of June, 2011

David J. Kappos
*Director of the United States Patent and Trademark Office*